United States Patent [19]
Katahara

[11] Patent Number: 4,975,615
[45] Date of Patent: Dec. 4, 1990

[54] PIEZOELECTRIC TRANSDUCER
[75] Inventor: Keith W. Katahara, Allen, Tex.
[73] Assignee: Atlantic Richfield Company, Los Angeles, Calif.
[21] Appl. No.: 363,660
[22] Filed: Jun. 8, 1989
[51] Int. Cl.[5] .......................................... H01L 41/08
[52] U.S. Cl. .................................................... 310/328
[58] Field of Search ........................ 310/323, 328, 366

[56] References Cited

U.S. PATENT DOCUMENTS

| | | | |
|---|---|---|---|
| 3,614,486 | 10/1971 | Smiley | 310/323 |
| 3,903,435 | 9/1975 | Bouygues et al. | 310/328 |
| 4,408,832 | 10/1983 | Hartman et al. | 310/328 X |
| 4,435,666 | 3/1984 | Fukui et al. | 310/328 |
| 4,506,154 | 3/1985 | Scire | 310/328 X |
| 4,518,887 | 5/1985 | Yano et al. | 310/328 |
| 4,644,213 | 2/1987 | Shibuya | 310/328 |
| 4,647,808 | 3/1987 | Shibuya | 310/328 |
| 4,675,568 | 6/1987 | Uchikawa et al | 310/328 |

FOREIGN PATENT DOCUMENTS 0187980  11/1982  Japan .................................. 310/328

OTHER PUBLICATIONS

Piezo Stroke Amplifier, by Sakman, IBM Technical Disclosure Bulletin, vol. 20, No. 6, Nov. 1977, p. 2263.

Primary Examiner—Mark O. Budd
Attorney, Agent, or Firm—Michael E. Martin

[57]     ABSTRACT

A piezoelectric transducer includes a stack of plates of piezoelectric material which are energized to elongate in a predetermined direction and to provide amplified mechanical displacement to a drive member through a set of levers. The levers are connected at one end to a frame supporting the transducer, are provided with hinges between the point of connection and a point of engagement with the piezoelectric actuator and are also connected at their opposite ends to the drive member. The lever arms provide amplified linear displacement to the drive member in response to energization of the actuator. The lever arrangement also provides for exertion of high compressive forces on the piezoelectric actuator in response to a low force, large displacement-causing signal.

5 Claims, 2 Drawing Sheets

PIEZOELECTRIC TRANSDUCER

BACKGROUND OF THE INVENTION

1. Field of the Invention

The present invention pertains to a piezoelectric transducer having a displacement amplification mechanism associated therewith for amplifying the linear displacement of the actuator when energized or, conversely, amplifying the force imposed on the piezoelectric element.

2. Background

Piezoelectric transducers are often used to convert electrical energy into mechanical energy and vice versa. Certain piezoelectric ceramic materials are capable of generating large forces when energized by an electrical potential signal and have a high force to bulk or space relationship. Moreover, unlike magnetostrictive or electromagnetic devices, piezoelectric transducers do not incur or become subject to electrical resistance losses. However, one disadvantage of piezoelectric actuators for some applications is their small displacement characteristic. For certain applications such as generating acoustic pulses in fluid mediums, a piezoelectric actuator or element requires complex construction or coupling to a mechanism for amplifying linear displacement in order to generate a suitable acoustic pulse. Examples of piezoelectric transducers which are adapted to provide amplified displacement for acoustic signal generation are disclosed and claimed in U.S. patent application Ser. No. 07/319,607, filed Mar. 6, 1989 in the name of Keith W. Katahara and U.S. patent application Ser. No. 07/353,067, filed May 17, 1989 in the name of Steven G. Petermann et al, both assigned to the assignee of the present invention. The present invention provides yet another improved piezoelectric actuator or transducer as described herein.

SUMMARY OF THE INVENTION

The present invention provides an improved piezoelectric actuator which includes displacement amplification means for amplifying the mechanical displacement of the piezoelectric element when energized by an electrical signal or, conversely, an amplified electrical signal is provided in response to a given force exerted on the transducer.

In accordance with one aspect of the present invention a piezoelectric element is coupled to a displacement member by a hinged lever mechanism wherein the linear displacement of the piezoelectric element is amplified by the lever mechanism which in turn is connected to the displacement member. In accordance with another aspect of the present invention, a piezoelectric transducer is provided which is characterized by a piezoelectric element coupled to a displacement member by a mechanical displacement amplification mechanism which is mechanically uncomplicated and is adapted to have negligible lost motion between the displacement member and the piezoelectric element, thereby minimizing the loss of displacement amplified by the mechanism and improving its sensitivity for certain applications.

In accordance with yet another aspect of the present invention there is provided a piezoelectric transducer characterized by a stack of ceramic piezoelectric disks or plate-like elements which are coupled to a lever mechanism by a low-friction connection comprising one or more generally cylindrical rods which engage a series of pivoted levers. The levers are supported on a frame which supports the piezoelectric elements and, in turn, the levers are connected to a displacement member whereby amplified linear displacement is exerted on the displacement member for a given linear displacement or expansion of the piezoelectric element.

The transducer of the present invention is relatively compact and has relatively low intrinsic loss characteristics. Mechanical lost motion is minimized and the transducer provides for efficiently matching a high mechanical impedance-type piezoelectric driver with a low mechanical impedance-type load. The displacement amplification is preferable for use in some applications over areal transformations in which a small area piezoelectric element drives a large area load. The transducer is particularly useful for applications in acoustic borehole logging equipment for operation at relatively low frequencies and where it is desirable to apply a small force over a relatively small area but with large displacement. An areal transformation device would not work as well given the very small volumes available in borehole logging tools. The above-described features and advantages as well as other superior aspects of the present invention will be further appreciated by those skilled in the art upon reading the detailed description which follows in conjunction with the drawing.

DESCRIPTION OF A PREFERRED EMBODIMENT

Figure 1:
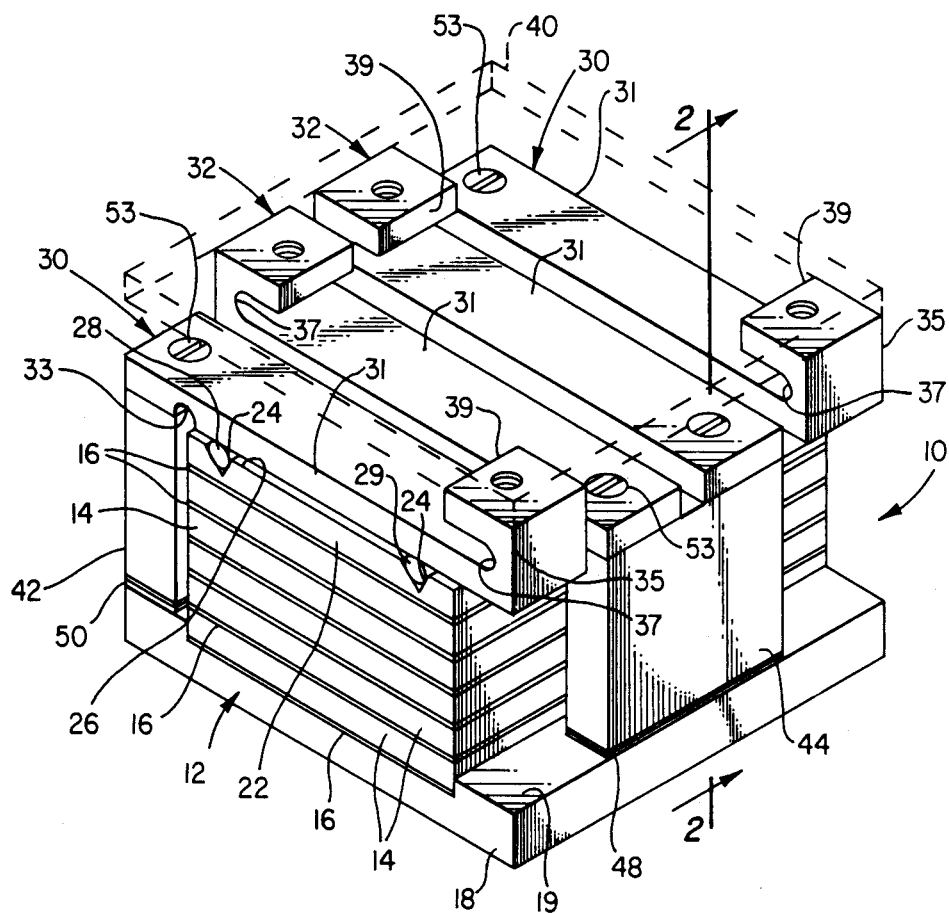
FIG. 1 is a perspective view of the improved piezoelectric of the present invention.

Referring to the drawing figures, there is illustrated an improved piezoelectric transducer, generally designated by the numeral 10. The transducer 10 includes a piezoelectric actuator 12 comprising a plurality of stacked plate or disk members 14 formed of a suitable ceramic material such as lead-zirconate-titanate (PZT) ceramic which have interposed therebetween metallic conductor plates or disks 16. As shown in FIG. 1, the actuator 12 is supported by a base member 18 of the transducer 10 which is of a generally rectangular configuration and has an elongated channel 20 formed therein for receiving the actuator 12. The uppermost plate member 14 supports a plate member 22 formed with a pair of parallel V-shaped grooves 24 extending along an upper planar surface 26. Generally cylindrical actuating pin members 28 and 29 are nested in the grooves 24 and protrude above the surface 26. The pins 28 and 29 are engaged with respective opposed lever members 30 and 32 in such a way that the pin 28 engages each of the lever members 30 and the pin 29 supports each of the lever members 32. The lever members 30 and 32 are of essentially identical configuration and are each formed with an integral hinge portion 33 defined by a notch or recess extending transversely. The lever members 30 and 32 each also include an elongated lever arm 31 connected to an end portion 35 having a somewhat J-shaped configuration and also including an integral hinge 37 extending parallel to the hinge 33. Plate member 22, pins 28 and 29, and lever members 30 and 32 are preferably made of hardened steel. A distal end 39 of each of the lever members 30 and 32 is adapted to be engaged with a displacement or drive member 40 which is a generally rectangular platelike member adapted to be in contact with other means for generating mechanical displacement of a mechanism or a liquid such as in the arrangement illustrated in FIG. 2.

Figure 2:
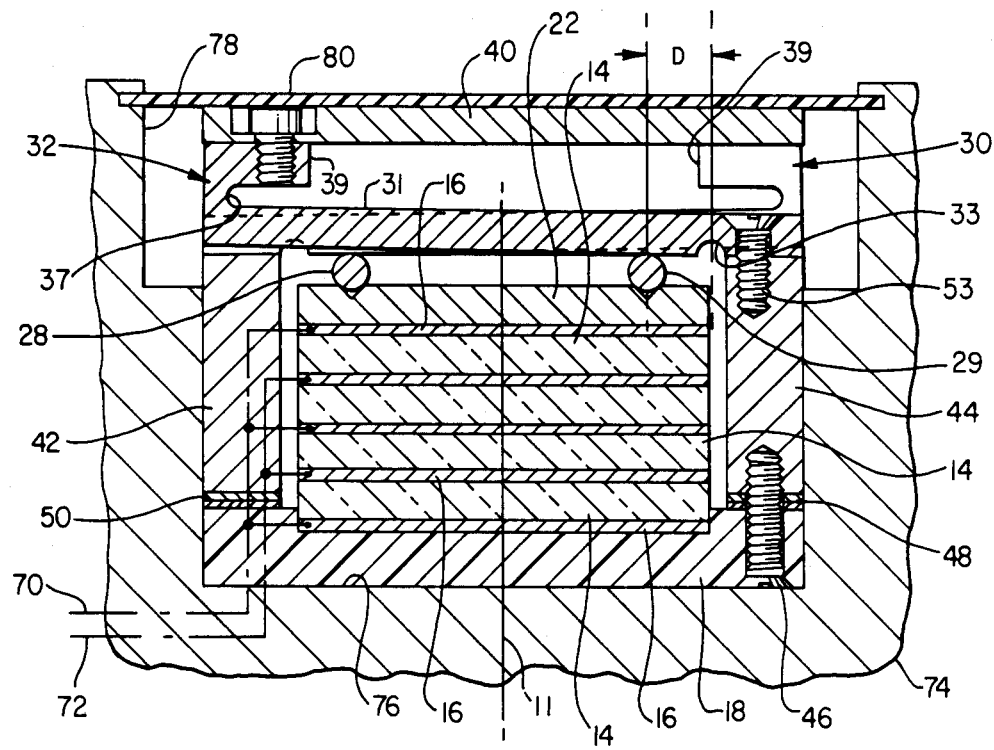
FIG. 2 is a section view taken generally along the line 2—2 of FIG. 1 showing the transducer in one useful operating environment.

The lever members 30 and 32 are also supported with respect to the baseplate 18 by upstanding pillar-like frame members 42 and 44, respectively. The lever members 30 may be supported on separate spaced-apart pillar members 42, as indicated in the drawing figures, or the pillar members may be a single member. As shown in FIG. 2, by way of example, the member 44 is connected to the baseplate 18 by suitable threaded fasteners 46 and the effective height of the member 44 may be adjusted by shims 48 interposed between the member 44 and the surface 19 of the baseplate member 18. In like manner the height of the pillar members 42 may be also be adjusted by shims 50 interposed between the pillar members and the baseplate 18. The pillar members 42 are similarly connected to the baseplate by threaded fasteners. The lever members 30 and 32 are removably connected to the pillar members 42 and 44, respectively, by suitable threaded fasteners 53. If desired, shims may be interposed between the mating surface of the lever members 30 and 32 and the top transverse surfaces of the pillar members 42 and 44.

As shown in FIG. 2 the conductor plates or disks 16 are electrically connected to suitable electrical conductors 70 and 72 such that alternate ones of the conductor plates are connected to the conductor 70 and alternate ones of the conductor plates are connected to the conductor 72. In this way an electrical potential may be imposed across each one of the piezoelectric ceramic plate members 14 simultaneously to effect mechanical elongation of the plates in a direction parallel to a central axis 11, FIG. 2. Although piezoelectric actuators typically exhibit relatively high displacement forces in response to an electrical signal imposed thereon or, develop an electrical signal in response to forces exerted on the plate members, the mechanical displacement of the plates is relatively slight. In accordance with the present invention the mechanical displacement of the actuator 12 is amplified by the provision of the rods 28 and 29 and the lever members 30 and 32. The amount of mechanical displacement is a function of the distance D between the pins 28 or 29 and the integral hinges 33 of the respective lever members 30 and 32. Moreover, since the lever arm of the members 30 and 32 essentially pivot about the hinges 33, the length of the lever members 30 and 32 control the displacement of the displacement member 40. In other words, the hinges 33 serve as a fulcrum wherein the point of engagement of the pins 28 and 29 with the lever members 30 and 32 exerts a relatively large force over a relatively small displacement and the distal ends of the lever members 30 and 32 undergo a relatively large displacement. The pins 28 and 29 also advantageously provide substantially nonareal point or line contact with the lever members 30 and 32.

In the illustration of FIG. 2 the transducer 10 is adapted for generating acoustic pulse-type signals for use in conjunction with an apparatus such as a well logging tool. In the illustration of FIG. 2 the tool has a body portion 74 in which is formed a cavity 76 for receiving the transducer 10. The transducer 10 is rigidly mounted in cavity 76 by means not shown in FIG. 2.

The cavity 76 has a counter portion 78 across which a flexible diaphragm-like member 80 may be disposed and suitably engaged with the displacement member 40. Alternatively, the displacement member 40 may be arranged to displace a quantity of liquid having a relatively low compressibility factor which, in turn, would act on a flexible member such as the diaphragm 80.

For operation at great depth in boreholes or in the ocean, the cavity 76 and the void spaces in transducer 10 must be filled with a fluid maintained at the same pressure as the external fluid. Such internal fluid would of course reduce the efficiency of the transducer, but this drawback is shared with most devices designed for deep operation.

The degree of displacement amplification, as mentioned previously, is controlled by the distance between the fulcrum provided by the hinges 33 and the contact point of the rods 28 and 29 and the distance between the contact point of the rods 28 and 29 with the lever members 30 and 32 and the lever ends 35 or some other suitable contact point between the lever members and a displacement member such as the member 40. This ratio can be inverted to produce a large force magnification rather than a large displacement magnification. The piezoelectric plate members 14 are preferably polarized axially in the direction of the axis 11 with adjacent ones of the plate members being polarized in opposite directions. In this way an electrical potential imposed simultaneously across each one of the plate members 14 will cause these members to elongate in the direction of the axis 11 accompanied by a suitable contraction along the respective orthogonal axes with respect to the axis 11.

It is intended to provide a significant compressive stress to the stack of plate members 14 forming the actuator 12 when the transducer 10 is assembled. The length of the pillar members 42 and 44 is predetermined to be such that when the lever members 30 and 32 are connected to the displacement member 40 and the pillar members 42 and 44 and the lever members are in engagement with respective ones of the rods 28 and 29, the arms 31 of the lever members 30 and 32 are flexed slightly so that a compressive force is exerted on the actuator stack. The amount of force may be controlled by the thickness of the stack of shims 50. The precompression on the actuator 12 provides for the actuator plate members 14 to react to both positive and negative applied electrical potentials in a roughly linear relationship. Precompression of the plate members 14 also reduces hysteresis. Dimensional control over the length of the pillars 42 and 44 together with the shims 50 provides for equal stresses on each lever arm when the levers 30 and 32 and their respective support pillars 42 and 44 are secured together and to the baseplate 18.

Operation of the transducer 10 is believed to be understandable to those of ordinary skill of the art of piezoelectric transducers from the foregoing description. The transducer 10 is a compact device which has little intrinsic loss characteristics and negligible mechanical lost motion or play. Moreover, the transducer 10 provides an improved actuator which utilizes a high mechanical impedance-type piezoelectric actuator element in combination with a low mechanical impedance-type load. Mechanical displacement amplification is desired in many applications, particularly in application of generating acoustic signals in fluids, especially at relatively low frequencies, and where it is desirable to provide a large displacement with the exertion of a relatively small force. Moreover, the transducer 10 may be operated as an electrical-signal-generating transducer responsive to displacement of the member 40 to generate a relatively high force acting on the actuator 12. The transducer 10 may be constructed of conventional engineering materials used for similar types of transducers and including the aforementioned ceramic material for the plate members 14. This particular type of ceramic exhibits relatively little change in volume when excited electrically.

Although a preferred embodiment of a high displacement piezoelectric transducer has been described in some detail herein, those skilled in the art will recognize that various substitutions and modifications may be made to the embodiment described without departing from the scope and spirit of the invention as recited in the appended claims.

What is claimed is:

1. A piezoelectric transducer comprising:
a frame comprising a baseplate and spaced apart pillar members;
actuator means supported on said baseplate comprising a plurality of elements forming a stack, each of said elements being formed of piezoelectric material and each of said elements being connected for receiving an electrical signal to cause elongation of said stack in a predetermined direction;
a displacement plate member for displacement of a fluid by said displacement member in response to elongation of said stack;
displacement amplifier means interconnecting said actuator means and said displacement member and comprising a plurality of opposed lever members supported at one end by said pillar means, respectively, each of said lever members including first hinge means formed adjacent said one end of said lever members and second hinge means at the opposite end of said lever members and forming a distal end of said lever members engageable with said displacement member for moving said displacement member linearly; and
spaced apart members engageable with said stack and with alternate ones of said lever members, respectively, for displacing said lever members and said displacement member in response to elongation of said stack.

2. The transducer set forth in claim 1 wherein:
said first hinge means comprises an integral reduced thickness portion of said lever members, respectively.

3. The transducer set forth in claim 1 wherein:
said second hinge means comprises an integral reduced thickness portion of said lever members, respectively.

4. The transducer set forth in claim 1 including:
means for securing said lever members to said pillar members and said pillar members to said baseplate for selective spacing of said lever members from said stack so as to provide a compressive force acting on said stack by said lever members when said actuator means is deenergized.

5. The transducer set forth in claim 1 wherein:
said spaced apart members comprise a pair of elongated rods forming substantially non-areal contact between said stack and said lever members at a point between said first and second hinge means, respectively.

* * * * *